Sept. 23, 1969  N. O. ROSAEN  3,468,420
FLUID FILTER
Filed Aug. 17, 1966  2 Sheets-Sheet 1
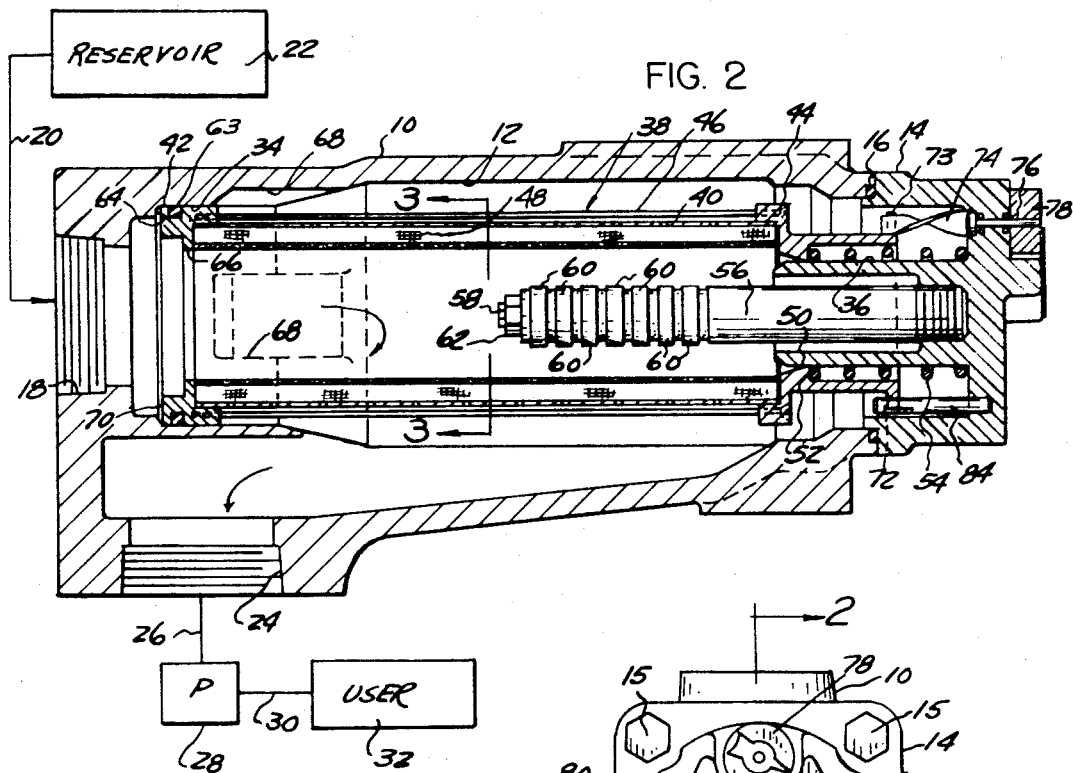
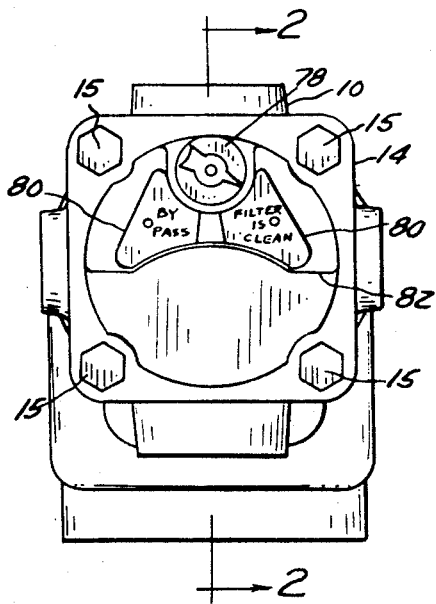
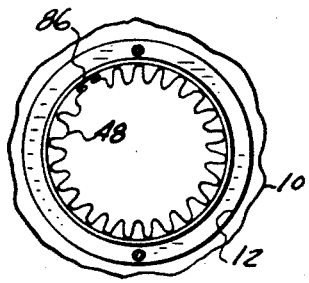
INVENTOR
NILS O. ROSAEN
BY *Hauke, Kraus, & Gifford*
ATTORNEYS Sept. 23, 1969     N. O. ROSAEN     3,468,420
FLUID FILTER
Filed Aug. 17, 1966     2 Sheets-Sheet 2
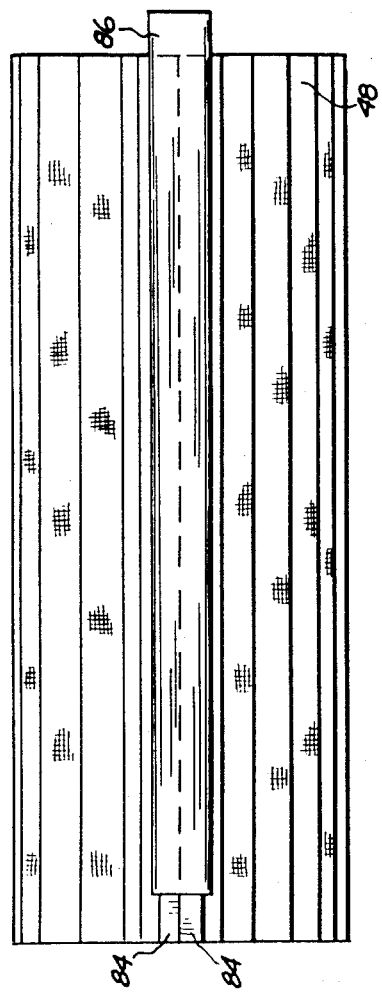
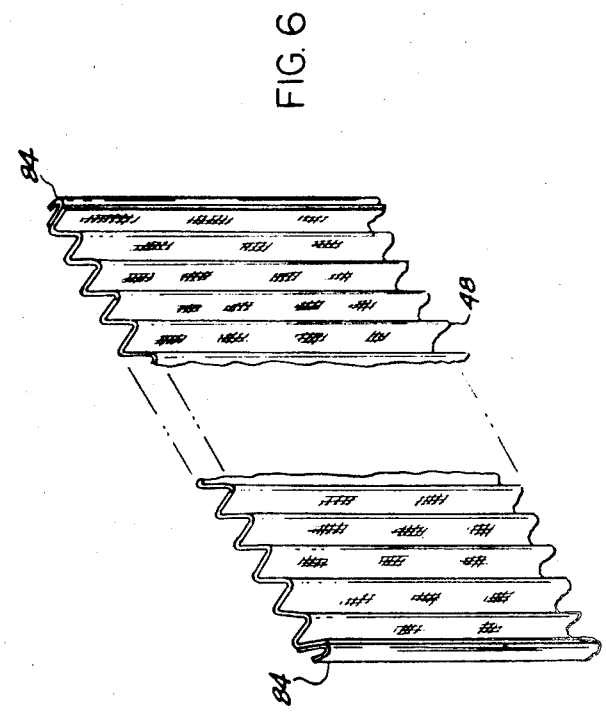
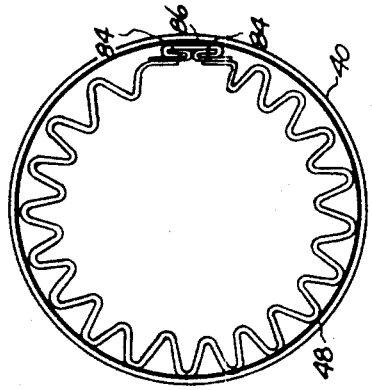
INVENTOR
NILS O. ROSAEN
BY Hauke, Krass, & Gifford
ATTORNEYS United States Patent Office 3,468,420
Patented Sept. 23, 1969

3,468,420
FLUID FILTER
Nils O. Rosaen, Bloomfield Hills, Mich., assignor, by mesne assignments, to Parker-Hannifin Corporation, Cleveland, Ohio, a corporation of Ohio
Filed Aug. 17, 1966, Ser. No. 573,079
Int. Cl. B01d *35/06, 35/00, 27/06*
U.S. Cl. 210—90                                                                          3 Claims

ABSTRACT OF THE DISCLOSURE

A filter device is provided with a filter assembly including a flat flexible filter element which can be rolled into a cylinder, a clip for securing the side edges of the filter element together, a cylinder encompassing the rolled element and a cap at each end of the cylinder to hold the element together.

---

The present invention relates to a fluid filter device and more particularly to such a device constructed to provide for easy removal and cleaning of the filter element when it has become clogged.

Fluid filters of the type to which this invention relates normally comprise a housing having a fluid inlet and a fluid outlet and a cylindrical filter element disposed in the housing intermediate the inlet and the outlet. Normally the fluid is introduced to an annular chamber surrounding the cylindrical filter element where it flows radially inwardly through the filter element in filtering engagement to remove any foreign matter contained therein and then discharged axially through the filter element to the fluid outlet. As the filter element becomes clogged, removal from the housing is required either to clean the element or to replace it. As the element is removed from the housing, some of the foreign matter tends to remain in the annular chamber or to fall from the circumferential surface of the element into the chamber. This foreign matter in the housing must be cleaned out before the device is put back into operation.

Another problem associated with cleaning of conventional fluid filter elements is related to the element itself. Normally the filter cartridge includes a filter element comprising a fine mesh, screen material formed into a cylinder and seated at each end in a flanged disc. In order to maximize the quantity of filtering material exposed to the flow of the fluid, the meshed screen is often pleated. When the element has become clogged sufficiently to require cleaning, the cylindrical construction of the element renders it extremely difficult and time consuming to remove the foreign matter captured by the mesh. It is difficult to wash out foreign matter contained within the element.

It is the broad purpose of the present invention to obviate the above problems associated with the cleaning of fluid filters. The preferred embodiment of the present invention, which will be subsequently described in detail, takes the form of a housing having a generally cylindrical chamber defined therein and with a fluid inlet and a fluid outlet communicating with the chamber. A cylindrical filter cartridge is disposed in the housing intermediate the fluid inlet and fluid outlet and arranged in such a fashion that the fluid flows through the inlet, axially into the cylindrical filter cartridge and then radially outwardly in filtering relationship. The filtered fluid then exits through the fluid outlet. This improved structure insures that foreign matter captured by the filtering mesh is trapped within the cylindrical cartridge. Thus, upon removal of the filter cartridge for cleaning, the foreign matter remains within the cartridge as it is withdrawn from the housing, thereby eliminating the possibility of foreign matter falling back into the filter chamber as is the case with conventional filter cartridges.

The improved filter device is further provided with means permitting the filter cartridge to slidably move from a first position within the filter chamber to a second position as the filter cartridge becomes clogged so that when the cartridge has become clogged to a predetermined degree, a bypass is opened to permit the fluid to flow directly from the inlet to the outlet. Furthermore, indicating means are provided for indicating the filtering condition of the filtering device to an attendant and which is responsive to the movement of the filter element as it becomes clogged with foreign matter.

The preferred filter cartridge comprises a pleated, fine-meshed, wire cloth element which is disposed in a perforated backing cylinder. The filter element preferably takes the form of a rectangular, flexible, pleated element having opposite side edges each provided with a J-shaped clip running the length of the side edges and which are engageable with one another by an elongated C-clip which is slidably engaged with the J-clips. When the side edges are joined together, the mesh element forms a cylindrical filter member. When the side edges are separated, the element unfolds for purposes of cleaning.

It is therefore an object of the present invention to improve the utilization of filter devices having an elongated cylindrical filter element disposed in a filter chamber by providing a flow path through the filter element wherein the fluid is delivered axially into the cylindrical filter element and then radially outwardly through the element for delivery to the fluid outlet of the device.

It is another object of the present invention to improve the cleaning of cylindrical filter elements by providing such an element comprising a rectangular flexible fine meshed material having longitudinal clip means engageable with opposite side edges of the filter element to form a cylinder and disengageable from the side edges to permit the filter element to be unfolded for purposes of cleaning.

It is a further object of the present invention to increase the operating time of fluid filtering devices by providing an improved bypass means operable upon a predetermined clogged condition of the filter element to open a fluid path directly from the inlet to the outlet side of the filter device.

It is still another object of the present invention to improve filtering devices by providing simplified means for indicating the clogged condition of the filter element.

Still further objects and advantages will readily occur to one skilled in the art to which the invention pertains upon reference to the following detailed description and the accompanying drawings in which like reference characters refer to like parts throughout the several views and in which:

FIG. 1 is an elevational end view of a preferred embodiment of the present invention;

FIG. 2 is a longitudinal cross-sectional view of the preferred embodiment of the present invention illustrated in FIG. 1 and taken substantially on line 2—2 of FIG. 1;

FIG. 3 is a cross-sectional view taken substantially along line 3—3 of FIG. 2;

FIG. 4 is an enlarged view of the cylindrical filter element illustrated in FIG. 3 to show the details of the longitudinal clip;

FIG. 5 is a longitudinal view of the filter element illustrated in FIG. 4 and with the longitudinal clip partially disengaged; and FIG. 6 illustrates the filter element shown in FIG. 4 with a longitudinal clip removed and the filter element unfolded from its cylindrical configuration.

DESCRIPTION

Now referring to the drawings for a more detailed description of the present invention, a preferred filter device is shown as comprising a housing member 10 defining a substantially cylindrical chamber 12. A cap member 14 is secured to one end of the housing 10 by any means such as bolts 15. The cap member 14 closes one end of the chamber 12. An O-ring seal 16 prevents leakage from the chamber 12 past the cap 14.

The housing 10 is provided with an axial inlet 18 connected by a conduit 20 to a fluid reservoir 22. The housing 10 is further provided with an outlet 24 which communicates the chamber 12 through a conduit 26 with a pump 28 which is fluidly connected through a conduit 30 to a fluid user 32. The outlet 24 is preferably generally laterally directed away from the chamber 12 and on the same end of housing 10 as inlet 18. The end of the chamber 12 adjacent the inlet 18 is circumferentially narrowed to provide a cylindrical guideway 34. The cap member 14 is provided with a cylindrical boss 36 which is arranged coaxially with the guideway 34.

A cylindrical filter cartridge generally indicated at 38 is disposed in the filter chamber 12 intermediate the inlet 18 and the outlet 24. The filter cartridge 38, as can best be seen in FIGS. 2 and 3, comprises a perforated, cylindrical, elongated reinforcing cylinder 40 sandwiched between a piston like cap 42 and an end cap 44 and locked therebetween by elongated bolts 46 passing through the end cap 44 and threaded into the piston like cap 42 as shown. A flexible, pleated, metallic, finely meshed cloth 48 is disposed inside the cylinder 40 and preferably has a length coextensive with the cylinder.

The piston-like cap 42 is axially slidably disposed in the guideway 34. The end cap 44 is provided with an annular surface 50 which axially slidably engages the cylindrical boss of the cap 14. The end cap 44 is further provided with an annular flange 52 which provides a seat for a spring bias member 54 which is disposed between the end cap 44 and the inner surface of the cap 14 to normally urge the filter cartridge in an axial direction toward the inlet 18.

The end cap 14 carries an axially inwardly directed rod member 56 having a narrowed free end section 58 which carries a plurality of magnets 60 which are locked thereon by nut 62. The magnets 60 collect magnetically attractive foreign matter in the fluid.

The piston like cap 42 carries a piston ring 63 which slidingly engages the guideway 34. The filter cartridge 38 is axially slidable in the filter chamber 12 between a first position wherein the cap 42 is seated on an annular rib 64 provided in the housing 10 and adjacent the inlet 18. The cap 42 includes an axial opening 66 and is movable from the first position toward a second position axially spaced away from the inlet opening 18. In the second position, the end of the cap 42 registers with a plurality of annularly spaced radial chamber recesses 68. The piston cap 42 further has an annular pressure surface 70 which is provided transversely to the axial movement of the filter cartridge 38.

As thus far described, the preferred filter device operates as follows: The filter cartridge 38 is normally urged to the left as viewed in FIG. 2 by the spring 54 so that the piston like cap 42 is seated against the rib 64. Fluid enters through the inlet 18 axially inwardly into the filter cartridge 38 and radially outwardly wherein it passes in filtering engagement with the mesh wire cloth 48 and through the perforated reinforcing cylinder 40 and to the outlet 24. As the mesh wire cloth 48 becomes clogged, a pressure differential is created across the piston like cap 42 since this member is carried intermediate the inlet and the outlet side of the filter cartridge 38. This produces a force acting on the pressure surface 70 sufficient to overcome the normal urging of the spring member 54 to move the filter cartridge 38 axially away from the seat 64. The filter cartridge 38 continues to move axially until piston-like cap 42 clears the chamber recesses 68 so that the fluid can pass directly from the inlet 18 around the filter cartridge 38 to the outlet 24. Thus a bypass fluid route is opened between the inlet 18 and the outlet 24. It will be noted that the bypass route does not pass through or contact foreign matter which has previously been filtered from the fluid and which is disposed in the mesh cloth 48 carried by the filter cartridge 38. Thus the foreign matter is trapped within the filter cartridge 38.

The preferred embodiment of the present invention also is provided with means for indicating the position of the filter cartridge and which corresponds to the filtering condition of the filter cartridge 38. This indicating means comprises an annular flange 72 carried at the extreme end of the end cap 44 and which is provided with a radially inwardly extending groove 73 having sides of which engage an actuator member 74 provided with a regular twist about its longitudinal axis from end to end and which is carried on the interior end of a pin member 76 supported for rotation in the cap 14. A pointer member 78 is secured to the outer end of the pin 76 and as can best be seen in FIG. 1, points to suitable indicia 80 corresponding to the position of the filter cartridge 38 and which are provided on an indicator plate 82. As the end cap 44 moves axially towards the cap 14, the twist of the actuator member 74 in combination with the groove flange 72 produces a rotation of the pin member 76 and the pointer member 80. The annular flange 72 also engages an axially aligned depending pin 84 which helps prevent rotation of the filter cartridge 38.

When it is necessary to remove the filter cartridge 38 for replacing or cleaning, the end cap 14 is removed from the chamber 12. It is apparent that foreign matter which has been filtered from the fluid and collected within the filter cartridge 38 will be removed therewith. Since substantially no foreign matter will be left in the chamber 12, this need not be cleaned before replacing the cap member 14.

Now referring to FIGS. 4, 5 and 6, the filter element 48 is cleaned by slidably removing it from within the reinforcing cylinder 40 after caps 42 and 44 and bolts 46 have been separated therefrom. As can best be seen in FIG. 4, the filter element 48 is provided with a pair of opposed side edges having longitudinally extending J-clips 84 which are engaged to one another by an elongated C-clip 86. The clips 84 and 86 preferably have a length corresponding to the length of the filter element 48. When the J-clips 84 are joined by the C-clips 86, the pleated filter element forms a generally cylindrical member. When the clip 86 is disengaged from the clips 84 by longitudinally sliding the clip 86 away from the clips 84 in the manner indicated in FIG. 5, so that the edges of the filter element carrying the J-clips may be separated, the filter element 48 can then be unrolled in the manner indicated in FIG. 6 for purposes of cleaning.

Now it can be seen that when the filter element 48 has been unrolled, that the foreign matter collected therein can be easily removed by washing in a suitable solvent. The filter element 48 can be quickly cleaned by applying the full force of a pressurized cleaning solvent directly on the filter element. When clean, the filter element is closed so that the J-clips carried by the opposite side edges are adjacent one another, and the C-clip 86 engaged with the J-clips 84 to form a cylindrical filter element which is then inserted in the cylinder 40 and combined with the piston cap 42 and the end cap 44 to form a clean filter cartridge 38.

Although I have described one embodiment of the present invention, it is apparent that many changes and modifications can be made therein without departing from the spirit of the invention or the scope of the appended claims.

I claim:
1. In a fluid filter device comprising a filter housing having a substantially cylindrical filter chamber and an opening provided at one end of said filter chamber, an end cap removably mounted to said housing to close said opening, a filter assembly having an exterior and an interior and means mounting said filter assembly within said filter chamber, said housing having an outlet connected with the filter chamber on the exterior of said filter assembly and an inlet connected with the interior of said filter assembly whereby fluid flow is from the interior of said filter assembly to the exterior thereof, said filter assembly being removable from said fluid chamber through said opening upon removal of said filter end cap, the improvement comprising said filter assembly including a meshed flexible filter element having a pair of side edges, said filter element being formed with a plurality of pleats parallel with said side edges whereby upon bringing said side edges together said filter element assumes a cylindrical, pleated shape, means for selectively joining said side edges together comprising a flanged member attached to each of said side edges on the exterior surface of said filter element, each of said flanged members having a flange portion generally parallel to and spaced outwardly from said side edges, said flange portions facing inwardly from said side edges toward the body of said filter element to define a pair of opposed slots extending the length of said filter element and a clip member having inwardly extending opposed flanges to be received in the open ends of said slots so that said clip member can be slid over the flange portions at the ends of said slots and then moved along said flange portions to lock said side edges together and whereby upon removal of said filter assembly from said housing said clip member is slid longitudinally to disengage from said flanged members and said filter element is laid out flat to be cleaned, the filter assembly further comprising a rigid perforated, elongated cylindrical member, said filter element being disposed within said cylindrical member, a first cap member disposed at one end of said cylindrical member, a second cap member disposed at the opposite end of said cylindrical member and having an axial opening therethrough and means releasably securing said cap members and said cylindrical member together, said housing includes an annular rib adjacent said inlet, and further including means carried by said end cap and operable when said end cap is secured to said housing to urge said filter assembly into sealing engagement with said annular rib.

2. In the filter device as defined in claim 1 and including magnet members carried in the interior of said filter assembly.

3. In the filter device as defined in claim 1 and in which said filter assembly is movable in response to changes in the pressure differential across said filter element and means indicating movement of said filter assembly exteriorly of said housing.

References Cited

UNITED STATES PATENTS

| | | | |
|---|---|---|---|
| 2,279,423 | 4/1942 | Vokes | 210—493 |
| 2,287,344 | 6/1942 | Easton et al. | 210—131 |
| 2,583,522 | 1/1952 | Winslow et al. | 210—223 |
| 2,937,754 | 5/1960 | Kasten | 210—131 |
| 3,016,984 | 1/1962 | Getzin | 210—497 X |
| 3,113,925 | 12/1963 | Rosaen | 210—131 X |
| 3,289,841 | 12/1966 | Quinting | 210—223 X |

FOREIGN PATENTS 109,892  2/1940  Australia.

SAMIH N. ZAHARNA, Primary Examiner

U.S. Cl. X.R.

210—131, 223, 232, 493